United States Patent
Morikami et al.

(10) Patent No.: US 10,703,038 B2
(45) Date of Patent: Jul. 7, 2020

(54) LIQUID BLOW MOLDING APPARATUS

(71) Applicant: YOSHINO KOGYOSHO CO., LTD., Tokyo (JP)

(72) Inventors: Shigeki Morikami, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 68 days.

(21) Appl. No.: 16/309,888

(22) PCT Filed: Apr. 20, 2017

(86) PCT No.: PCT/JP2017/015951
§ 371 (c)(1),
(2) Date: Dec. 13, 2018

(87) PCT Pub. No.: WO2018/003256
PCT Pub. Date: Jan. 4, 2018

(65) Prior Publication Data
US 2019/0168438 A1    Jun. 6, 2019

(30) Foreign Application Priority Data
Jun. 30, 2016  (JP) .................................. 2016-130793

(51) Int. Cl.
*B29C 49/46* (2006.01)
*B29C 49/12* (2006.01)
(Continued)

(52) U.S. Cl.
CPC .............. *B29C 49/12* (2013.01); *B29C 49/06* (2013.01); *B29C 49/46* (2013.01); *B29C 49/58* (2013.01);
(Continued)

(58) Field of Classification Search
CPC .............. B29C 49/46; B29C 2049/465; B29C 2049/4655; B29C 2049/4664; B29C 49/58; B29C 2049/5803
See application file for complete search history.

(56) References Cited

U.S. PATENT DOCUMENTS 8,998,603 B2    4/2015  Voth
9,180,621 B2 *  11/2015  Sato ........................ B29C 49/58
(Continued)

FOREIGN PATENT DOCUMENTS

JP    H11-138619 A    5/1999
JP    2013-248748 A   12/2013
(Continued)

OTHER PUBLICATIONS

Jun. 6, 2017 International Search Report issued in International Patent Application No. PCT/JP2017/015951.
(Continued)

*Primary Examiner* — Robert B Davis
(74) *Attorney, Agent, or Firm* — Oliff PLC

(57) ABSTRACT

A liquid blow molding apparatus includes a rod guide interposed between the seal body and the stretching rod to suppress misalignment in the radial direction of the stretching rod with respect to the seal body and to seal a gap between the seal body and the stretching rod in a fluid-tight manner, and the seal body has a detachable portion detachably attached to the main body of the seal body to hold the rod guide between the detachable portion and the main body.

4 Claims, 2 Drawing Sheets

(51) Int. Cl.
  *B29C 49/06* (2006.01)
  *B29C 49/58* (2006.01)
  *B29L 31/00* (2006.01)

(52) U.S. Cl.
  CPC . *B29C 2049/129* (2013.01); *B29L 2031/7158* (2013.01)

(56) References Cited

U.S. PATENT DOCUMENTS

| | | |
|---|---|---|
| 2012/0207872 A1 | 8/2012 | Lisch et al. |
| 2015/0328824 A1 | 11/2015 | Morikami et al. |
| 2016/0121539 A1 | 5/2016 | Chauvin et al. |
| 2019/0084211 A1 * | 3/2019 | Okuyama ............ B29C 49/783 |

FOREIGN PATENT DOCUMENTS

| | | | |
|---|---|---|---|
| JP | 2014-506843 A | 3/2014 | |
| WO | 2014/180805 A1 | 11/2014 | |
| WO | WO-2018198448 A1 * | 11/2018 | ............ B29C 49/46 |
| WO | WO-2019147222 A1 * | 8/2019 | ............ B29C 49/12 |

OTHER PUBLICATIONS

Feb. 3, 2020 Extended Search Report issued in European Patent Application No. 17819623.4.

* cited by examiner

LIQUID BLOW MOLDING APPARATUS

TECHNICAL FIELD

The present disclosure relates to a liquid blow molding apparatus.

BACKGROUND

Resin bottles, typical examples of which are oriented polypropylene (OPP) bottles and polyethylene terephthalate (PET) bottles, are used in a variety of applications, such as beverage applications, food applications, and cosmetic applications. Such a bottle is typically formed into a predetermined shape by heating a resin preform formed to have a bottomed shape for example by injection molding to a temperature which can have a stretching effect and biaxial stretch blow molding in this state using a blow molding apparatus.

As a blow molding apparatus, a liquid blow molding apparatus is known, which is configured to use a pressurized liquid instead of pressurized air as a pressurized fluid supplied into a preform. In the liquid blow molding apparatus, when a content liquid such as a beverage, a cosmetic product, a pharmaceutical product, or the like to be eventually poured as a product into a bottle is used as the pressurized fluid, the filling of the bottle with the content liquid can be omitted. Thus, the production process and the structure of the production apparatus can be simplified.

For example, JP 2013-248748 A (PTL 1), JP 2014-506843 A (PTL 2), and WO 2014/180805 (PTL 3) disclose a liquid blow molding apparatus comprising: a metal mold having a cavity in which a trunk of a preform is disposed; a nozzle connected to a mouth of the preform; a seal body movable between a closed position where the seal body abuts an inner surface of the nozzle to close the nozzle and an open position where the seal body is kept away from the inner surface of the nozzle to open the nozzle; and a stretching rod vertically movable relative to the seal body, in which a pressurized liquid is introduced into the preform from the nozzle to stretch the preform at least radially by moving the seal body from the closed position to the open position, and the preform is axially stretched using the stretching rod, thereby forming the preform into a container having a trunk of a shape conforming to the cavity.

Further, the liquid blow molding apparatus disclosed in PTL 1 includes a rod guide interposed between the seal body and the stretching rod to suppress misalignment in the radial direction of the stretching rod with respect to the seal body and to seal a gap between the seal body and the stretching rod in a fluid-tight manner.

CITATION LIST

Patent Literature

PTL 1: JP 2013-248748 A
PTL 2: JP 2014-506843 A
PTL 3: WO2014/180805

SUMMARY

Technical Problem

However, in a conventional liquid molding apparatus as disclosed in PTL 1, a rod guide is firmly joined to a lower end surface of a seal body to form an undercut shape, thus it has been difficult to repair (replace) the rod guide for example when the rod guide wears.

The present disclosure has been conceived in order to solve the problem described above, and it could be helpful to provide a liquid molding apparatus of which rod guide can easily be repaired or replaced.

Solution to Problem

A liquid molding apparatus of the present disclosure includes:
a metal mold having a cavity in which a preform is disposed;
a nozzle connected to a mouth of the preform;
a seal body movable between a closed position where the seal body abuts an inner surface of the nozzle to close the nozzle and an open position where the seal body is kept away from the inner surface of the nozzle to open the nozzle; and
a stretching rod vertically movable relative to the seal body.

A pressurized liquid is introduced into the preform from the nozzle to stretch the preform at least radially by moving the seal body from the closed position to the open position, and the preform is axially stretched by the stretching rod, thereby forming the preform into a container having a portion of a shape conforming to the cavity,
the liquid molding apparatus includes a rod guide interposed between the seal body and the stretching rod to suppress misalignment in the radial direction of the stretching rod with respect to the seal body and to seal a gap between the seal body and the stretching rod in a fluid-tight manner, and
the seal body has a detachable portion detachably attached to the main body of the seal body to hold the rod guide between the detachable portion and the main body.

Preferably, in the liquid blow molding apparatus according to this disclosure, the detachable portion includes an engagement tubular provided with a threaded portion on one of an outer circumferential surface and an inner circumferential surface, and the detachable portion can be screwed into the main body by threading the engagement tubular.

Further, in the liquid blow molding apparatus according to this disclosure, the detachable portion preferably has a ring-shaped outer circumferential surface placed in contact with or in proximity with an inner circumferential surface of an outlet of the nozzle when the seal body is in the closed position.

Advantageous Effect

The present disclosure provides a liquid blow molding apparatus of which rod guide can easily be repaired or replaced.

BRIEF DESCRIPTION OF THE DRAWINGS

In the accompanying drawings.

DETAILED DESCRIPTION

A liquid blow molding apparatus according to one embodiment of the present disclosure will now be described in detail with reference to the drawings.

Figure 1:
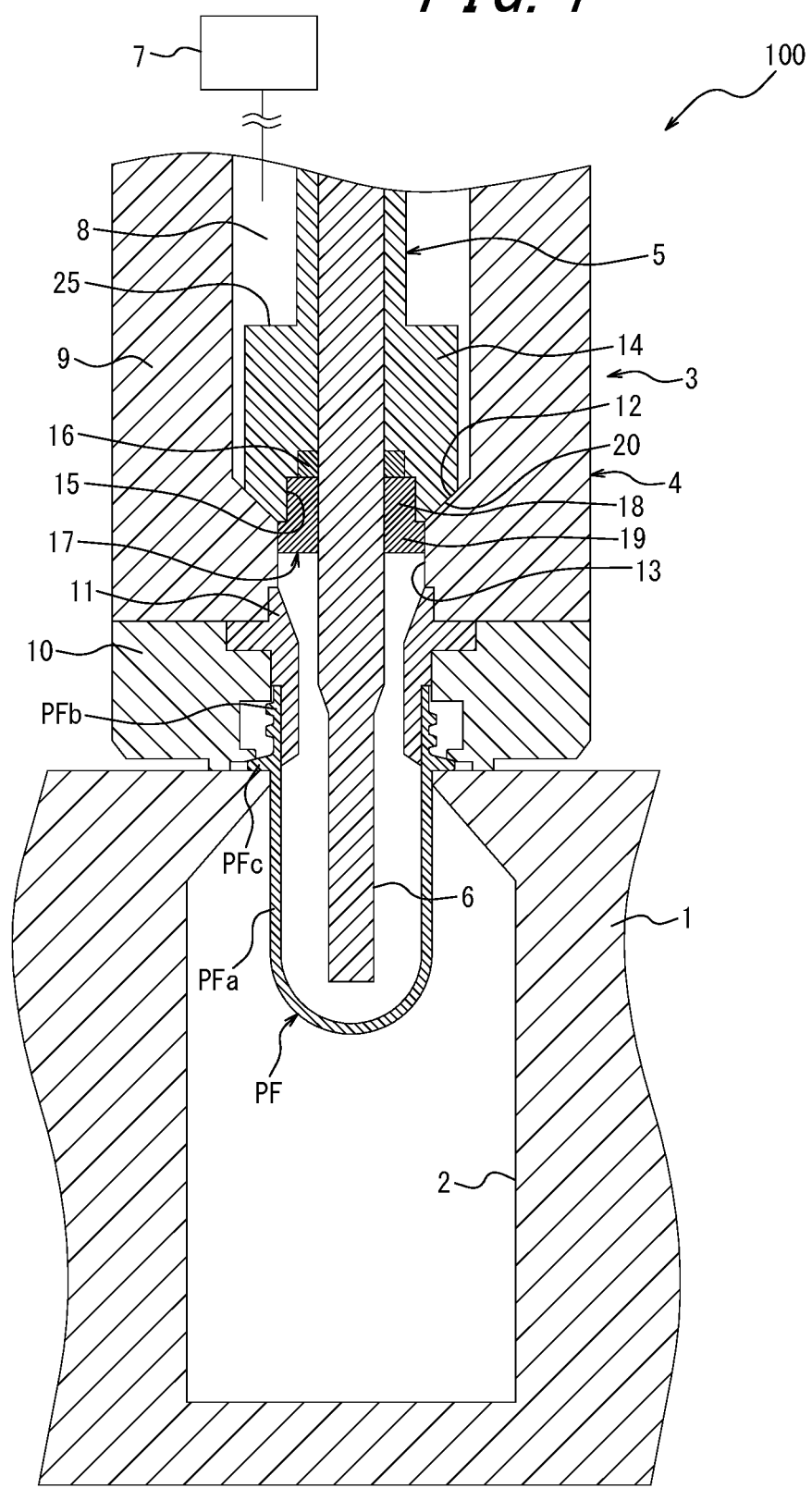
FIG. 1 is a vertical cross-sectional view schematically depicting a liquid blow molding apparatus according to one embodiment of the present disclosure.

As illustrated in FIG. 1, a liquid blow molding apparatus 100 of this embodiment has a metal mold 1 for blow molding. A cavity 2 of this metal mold 1 is shaped like a bottle and is open upward in the upper surface of the metal mold 1. Although details are not shown, the metal mold 1 is configured to be opened right and left, and a formed product can be taken out from the metal mold 1 by opening the metal mold 1.

A preform PF to be formed into a container of a bottle shape by this liquid blow molding apparatus 100 can be fit to the metal mold 1. The preform PF used may be formed from a resin material such as polypropylene (PP) or polyethylene terephthalate (PET) and may be shaped like a test tube as a whole. Note that the preform PF may have a single layer structure or may have a multilayer structure employed for example to impart barrier properties or to form a delamination container.

The preform PF depicted in FIG. 1 includes a trunk PFa of a bottomed cylinder shape and a cylindrical mouth PFb connecting to the trunk PFa, and further includes a ring-shaped neck ring PFc integrally formed with a lower end of the mouth PFb. In this preform PF, the trunk PFa is placed in the cavity 2 of the metal mold 1 along the axial center of the cavity 2, and the preform PF is attached to the metal mold 1 such that the neck ring PFc abuts on the upper surface of the metal mold 1 and the mouth PFb projects outward (upward in FIG. 1) from the metal mold 1. Note that the neck ring PFc is not necessarily provided.

A nozzle unit 3 is provided above the metal mold 1 to be vertically movable relative to the metal mold 1. This nozzle unit 3 includes a nozzle 4, a seal body 5, a stretching rod 6, and a pressurized liquid supply portion 7.

The nozzle 4 has a cylindrical shape as a whole and defines inside a supply path 8 to be a path for a pressurized liquid supplied from the pressurized liquid supply portion 7. In the illustrated example, the nozzle 4 includes an upper member 9, a lower member 10 attached to the upper member 9, and an outlet member 11 constituting an outlet for a pressurized liquid, held between those members. The outlet member 11 is connected to the mouth PFb of the preform PF in a fluid-tight manner. Note that the outlet member 11 does not necessarily have an insert to be inserted into the mouth PFb of the preform PF as in the illustrated example.

In the illustrated example, when the nozzle unit 3 is lowered to the lower end, the mouth PFb of the preform PF attached to the metal mold 1 is placed inside the lower member 10 so that the outlet member 11 is connected to the relevant mouth PFb in a fluid-tight manner and the neck ring PFc is interposed between the lower end of the lower member 10 and the upper surface of the metal mold 1. Thus, the preform PF fit is retained in an orientation that is perpendicular to the metal mold 1.

A seal surface 12 inclined to form a conical surface having a reduced diameter downward is provided in a lower part of the inner surface of the upper member 9 that forms the supply path 8. The axial center of the seal surface 12 is provided with a communication hole 13 opening downward to communicate the supply path 8 with the outlet member 11.

A seal body 5 for opening and closing the supply path 8 is placed inside the nozzle 4. The seal body 5 includes a main body 14 shaped like a hollow cylinder. A columnar holding recess 15 that recedes upward and is provided with an insertion hole for a stretching rod 6 at the center is formed in a lower end part of the main body 14. The holding recess 15 has a columnar shape having two constant diameters in which a small diameter portion is placed on the upper side and a large diameter portion is placed on the lower side, and a rod guide 16 is disposed in the small diameter portion. The structure of the holding recess 15 is not limited to such a two-diameter columnar structure; alternatively, the holding recess 15 may have a columnar structure with three or more diameters or a columnar structure with one diameter. In addition, the shape is not limited to a columnar shape. Further, the seal body 5 includes a detachable portion 17 that is detachably attached to the main body 14 to hold the rod guide 16 between the main body 14 and the detachable portion 17.

When attached to the main body 14, the detachable portion 17 includes a cylindrical engagement tubular 18 disposed in the large diameter portion of the holding recess 15, and a cylindrical protruding portion 19 protruding downward from the engagement tubular 18 under the main body 14. The upper end surface of the engagement tubular 18 forms a ring-shaped plane. The protruding portion 19 has a larger diameter than the engagement tubular 18, and the upper surface of the protruding portion 19 forms a ring-shaped plane. When the detachable portion 17 is attached to the main body 14, the upper surface of the protruding portion 19 abuts the lower end surface of the main body 14 that forms a ring-shaped plane (the outer peripheral edge of the holding recess 15), thus the vertical position of the detachable portion 17 relative to the main body 14 is fixed. Instead of or in addition to this structure, a structure may be employed in which, with the detachable portion 17 being attached to the main body 14, when the upper end surface of the engagement tubular 18 is in contact with a step portion forming a ring-shaped plane between the large diameter potion and the small diameter portion of the holding recess 15, the vertical position of the detachable portion 17 relative to the main body 14 is fixed. Note that the protruding portion 19 may be formed to have a diameter equal to or smaller than the diameter of the engagement tubular 18. Further, the shape of the protruding portion 19 is a cylindrical shape as described above and is not limited to a circular cylindrical shape.

The detachable portion 17 can be screwed into the main body 14 for example by forming a threaded portion on the outer circumferential surface of the engagement tubular 18 and forming a threaded portion matching the treaded portion on the holding recess 15, and threading the engagement tubular 18. It should be noted that instead of such threaded engagement, fitting using an undercut shape may be performed. Further, the shape of the engagement tubular 18 is not limited to the circular cylinder shape an may be a cylindrical shape.

A tapered abutment surface 20 is provided on the lower end portion of main body 14 of the seal body 5. This abutment surface 20 has the same inclination angle as the seal surface 12 and can be in close contact with the seal surface 12. The seal body 5 is configured to be vertically movable relative to the nozzle 4. When the seal body 5 moves to the lower stroke end, the abutment surface 20 of the seal body 5 abuts the seal surface 12 in a lower part of the nozzle 4, and the supply path 8 or the nozzle 4 is closed by the seal body 5. On the other hand, when the seal body 5 moves upward, the abutment surface 20 of the seal body 5 moves away from the seal surface 12 of the nozzle 4, and the supply path 8 or the nozzle 4 is opened.

The seal body 5 is hollow and the stretching rod 6 is disposed inside the seal body 5. The stretching rod 6 is vertically movable relative to the seal body 5 and the lower end of the stretching rod 6 can protrude from the lower end of the seal body 5. The stretching rod 6 can be moved downward to vertically (axially) stretch the preform PF. The stretching rod 6 may have a shape of which lower end portion has a reduced diameter as in the illustrated example or may have a different shape. The lower end of the stretching rod 6 need not always protrude from the lower end of the seal body 5.

The ring-shaped rod guide 16 disposed inside the seal body 5 as described above is interposed between the seal body 5 and the stretching rod 6. With this rod guide 16 being interposed, misalignment (backlash) in the radial direction of the stretching rod 6 relative to the seal body 5 can be reduced and the gap between the seal body 5 and the stretching rod 6 is sealed in a fluid-tight manner.

The rod guide 16 has an upper surface and a lower surface each forming a ring-shaped plane, and an outer circumferential surface and an inner circumferential surface each forming a columnar surface. When the detachable portion 17 is attached to the main body 14, the upper surface of the rod guide 16 abuts a top surface of the holding recess 15, a lower surface of the rod guide 16 abuts the upper end surface of the engagement tubular 18 of the detachable portion 17, the outer circumferential surface of the rod guide 16 abuts a periphery of the small diameter portion of the holding recess 15, and the inner circumferential surface of the rod guide 16 abuts a periphery of the stretching rod 6. It should be noted that as long as misalignment in the radial direction of the stretching rod 6 with respect to the seal body 5 and a gap between the seal body 5 and the stretching rod 6 can be sealed in a fluid-tight manner, a gap may be formed between the rod guide 16 and an adjacent member (for example, when a plurality of vertical grooves vertically extending on the outer circumferential surface of the rod guide 16 are formed and are fitted in a periphery of the small diameter portion of the holding recess 15, the periphery forming a columnar surface).

Note that the material of the rod guide 16 can be properly selected considering heat resistance, durability, sliding characteristics, etc. Examples of a suitable material of the rod guide 16 include, for example, resins such as a polyether ether ketone (PEEK) resin. Note that materials used to form the seal body 5 (main body 14 and detachable portion 17) and the stretching rod 6 are not limited to metals but may be resin materials.

As the pressurized liquid supply portion 7, for example, one that is configured to employ a plunger pump as a pressure source is preferably used; however, one having a different structure may be used as long as a liquid pressurized to a predetermined pressure can be supplied to the supply path 8.

With the use of the liquid blow molding apparatus 100 having such a structure, in the state where the trunk PFa of the preform PF is disposed in the cavity 2 of the metal mold 1 and the nozzle 4 is connected to the mouth PFb of the preform PF, when the seal body 5 is moved from the closed position to the open position, a pressurized liquid is introduced from the nozzle 4 into the preform PF to stretch the preform PF at least in the radial direction and the preform PF is stretched in the axial direction using the stretching rod 6, thus the preform PF can be formed into a container having a portion of a shape conforming to the cavity 2.

In this case, the timing with which the preform PF is stretched in the axial direction using the stretching rod 6 can be determined as appropriate. For example, the stretching using the stretching rod 6 may be started either before or after the start of the introduction of a pressurized liquid into the preform PF, and the stretching using the stretching rod 6 may be terminated either before or after the start of the introduction of a pressurized liquid into the preform PF.

Here, for the liquid blow molding apparatus 100 of this embodiment, the seal body 5 has the detachable portion 17 that is detachably attached to the main body 14 of the seal body 5 to hold the rod guide 16 between the detachable portion 17 and the main body 14, thus the rod guide 16 can easily be repaired or replaced for example when the rod guide 16 wears or fractures or when the rod guide 16 undergoes regular maintenance. Specifically, when the detachable portion 17 is detached from the main body 14 of the seal body 5, the rod guide 16 can easily be removed from the seal body 5 and for example can be replaced with a new rod guide 16. In addition, after the rod guide 16 is repaired or replaced, attaching the detachable portion 17 to the main body 14 ensures that the rod guide 16 is prevented from dropping off from the seal body 5. Further, since the rod guide 16 is prevented from being exposed, the rod guide 16 can be prevented from wearing or fracturing due to sliding or collision with portions other than the stretching rod 6 (inner surface of the nozzle 4 etc.). Further, at least part of the protruding portion 19 is exposed outside the main body 14, and controlling the exposed portion facilitates attachment and detachment of the main body 14 and the detachable portion 17.

When the engagement tubular 18 is configured to be screwed into the main body 14 by threading the engagement tubular 18 into the holding recess 15, such an effect can be obtained due to the simple structure.

Figure 2:
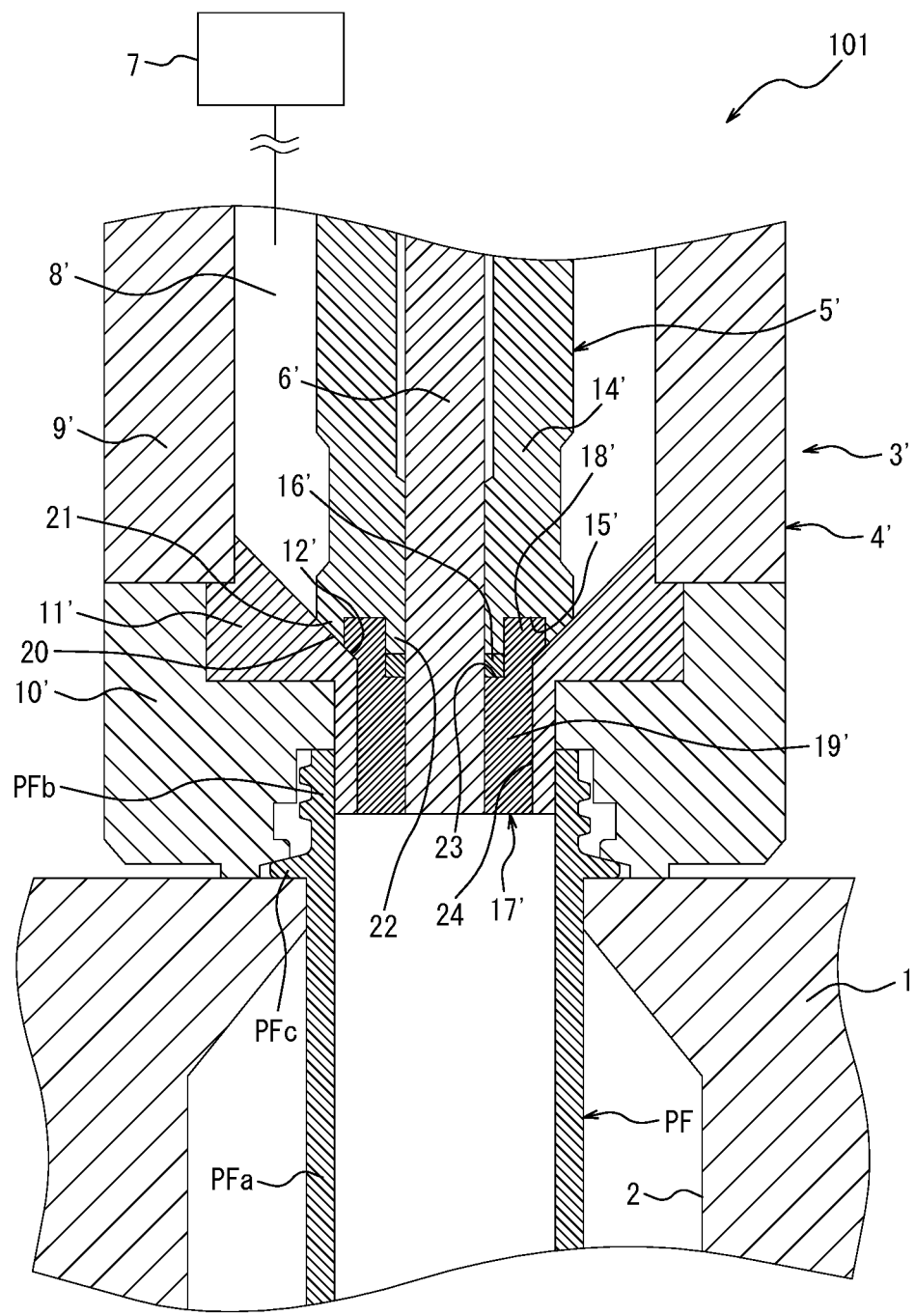
FIG. 2 is a vertical cross-sectional view schematically depicting a variant of the liquid blow molding apparatus in FIG. 1.

Further, the above-described liquid blow molding apparatus 100 may be configured as in a variant depicted in FIG. 2. In a liquid blow molding apparatus 101 of this variant, a holding recess 15' is formed between a ring-shaped outer wall portion 21 and a ring-shaped inner wall portion 22. Specifically, the holding recess 15' has a ring-shaped upper surface, an outer circumferential surface of the inner wall portion 22 that is a columnar surface, and an inner circumferential surface of the outer wall portion 21 that is a columnar surface.

An upper part of the engagement tubular 18' in the detachable portion 17' is placed in the holding recess 15'. Further, a rod guide 16' is disposed between a ring-shaped step portion 23 extending radially inward from the lower end of a lower part of the engagement tubular 18' and a ring-shaped lower end surface of the inner wall portion 22.

The detachable portion 17' can be screwed into the main body 14' for example by forming a threaded portion on an inner circumferential surface of the outer wall portion 21 and forming a threaded portion matching the threaded portion on an outer circumferential surface of the engagement tubular 18', and threading the engagement tubular 18'. Instead of such a structure, a structure may be used in which the detachable portion 17' is screwed into the main body 14' by forming a threaded portion on an outer circumferential surface of the inner wall portion 22 and forming a threaded portion matching the threaded portion on an inner circumferential surface of the engagement tubular 18', and threading the engagement tubular 18'. It should be noted that instead of such threaded engagement, fitting using an undercut shape may be performed.

Further, in the example illustrated in FIG. 1, the abutment surface 20 that is provided on the seal body 5 and is inclined to form a conical surface having a reduced diameter downward is constituted by the main body 14, whereas in the variant illustrated in FIG. 2, such an abutment surface 20' is constituted by the detachable portion 17' and the main body 14'. Note that instead of such a structure, a structure may be employed in which the abutment surface 20' is constituted only by the detachable portion 17'.

Further, in this variant, a seal surface 12' is provided on an outlet member 11' forming an outlet for a pressurized liquid. With such a structure, a sealing portion for closing the nozzle 4' by the seal body 5' can be made close to the outlet, thus the amount of the pressurized liquid introduced into the preform PF (the amount of a content liquid when the content liquid to be contained in a container is the pressurized liquid) can be controlled more easily.

Further, in this variant, the protruding portion 19' of the detachable portion 17' has an outer circumferential surface that is a columnar surface placed in contact with or in proximity to an inner circumferential surface of the outlet 24 of the nozzle 4' when the seal body 5' is in the closed position. Accordingly, when the seal body 5' moves to the closed position, the protruding portion 19' allows liquid adhering to the inner circumferential surface of the outlet 24 to drop, thus drainage of the liquid from the outlet 24 in detaching the nozzle 4' from the mouth of a formed container can be improved and the liquid adhering to the metal mold 1 and the container can be reduced. Note that a gap provided when an outer circumferential surface of the protruding portion 19' is arranged in proximity to the outlet 24 can be appropriately set depending on the viscosity of the pressurized liquid to be used. Further, the shape of the outer circumferential surface of the protruding portion 19' is a not limited to a columnar surface.

Note that in the embodiment illustrated in FIG. 1, the main body 14 of the seal body 5 forms a larger diameter portion under the step surface 25 at the lower end of an elongated cylindrical shaft part. In such a structure, when the nozzle 4 is closed by the seal body 5, pressure from the liquid acts on the step surface 25, which allows the closed state to be well kept; however, the pressure becomes a resistance in moving the seal body 5 to the open position, which could unintentionally delay the operation of moving the seal body 5. In this respect, in this variant, the main body 14' of the seal body 5' has a shape which prevents such pressure from the liquid from significantly affecting the moving operation of the seal body 5'.

In the embodiments described above, the closure of the nozzle 4, 4' by the seal body 5, 5' may be performed by in addition to the abutment of the abutment surface 20, 20' of the seal body 5, 5' and the seal surface 12, 12' of the nozzle 4, 4', the abutment of the outer circumferential surface which is a columnar surface of the protruding portion 19, 19' and an inner surface of the nozzle 4, 4'. For the detachable portion 17, 17', detachable portions having the protruding portions 19, 19' of different shapes are prepared and the detachable portion is replaced as necessary to change the shape of the protruding portion 19, 19' constituting a tip of the seal body 5, 5', thus different functions (closing the nozzle 4, 4', drainage improvement, etc.) can be selectively added.

The above describes mere embodiments of this disclosure, and various modifications can be made without departing from the scope of the claims.

REFERENCE SIGNS LIST

1 Metal mold
2 Cavity
3, 3' Nozzle unit
4, 4' Nozzle
5, 5' Seal body
6, 6' Stretching rod
7 Pressurized liquid supply portion
8, 8' Supply path
9, 9' Upper member
10, 10' Lower member
11, 11' Outlet member
12, 12' Seal surface
13 Communication hole
14, 14' Main body
15, 15' Holding recess
16, 16' Rod guide
17, 17' Detachable portion
18, 18' Engagement tubular
19, 19' Protruding portion
20 Abutment surface
21 Outer wall portion
22 Inner wall portion
23 Step portion
24 Outlet
25 Step surface
100, 101 Liquid blow molding apparatus
PF Preform
PFa Trunk
PFb Mouth
PFc Neck ring

The invention claimed is:

1. A liquid molding apparatus comprising:
   a metal mold having a cavity in which a preform is disposed;
   a nozzle connected to a mouth of the preform;
   a seal body movable between a closed position where the seal body abuts an inner surface of the nozzle to close the nozzle and an open position where the seal body is kept away from the inner surface of the nozzle to open the nozzle; and
   a stretching rod vertically movable relative to the seal body,
   wherein a pressurized liquid is introduced into the preform from the nozzle to stretch the preform at least radially by moving the seal body from the closed position to the open position, and the preform is axially stretched by the stretching rod, thereby forming the preform into a container having a portion of a shape conforming to the cavity,
   the liquid molding apparatus includes a rod guide interposed between the seal body and the stretching rod to suppress misalignment in the radial direction of the stretching rod with respect to the seal body and to seal a gap between the seal body and the stretching rod in a fluid-tight manner, and
   the seal body has a detachable portion detachably attached to the main body of the seal body to hold the rod guide between the detachable portion and the main body.

2. The liquid blow molding apparatus according to claim 1, wherein the detachable portion includes an engagement tubular provided with a threaded portion on one of an outer circumferential surface and an inner circumferential surface, and the detachable portion can be screwed into the main body by threading the engagement tubular.

3. The liquid blow molding apparatus according to claim 1, wherein the detachable portion has a ring-shaped outer circumferential surface placed in contact with or in proximity with an inner circumferential surface of an outlet of the nozzle when the seal body is in the closed position.

4. The liquid blow molding apparatus according to claim 2, wherein the detachable portion has a ring-shaped outer circumferential surface placed in contact with or in proximity with an inner circumferential surface of an outlet of the nozzle when the seal body is in the closed position.

\* \* \* \* \*